UNITED STATES PATENT OFFICE.

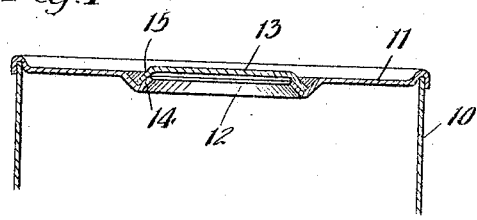
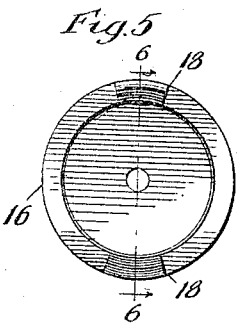
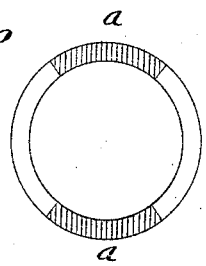
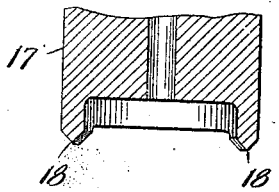
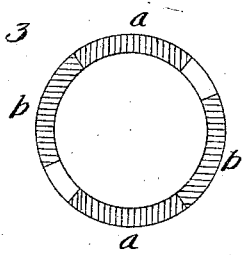
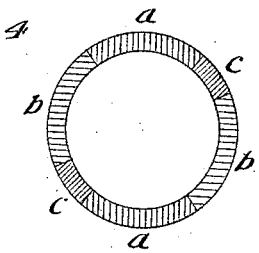

WILLIAM E. TAYLOR, OF NEW YORK, N. Y., ASSIGNOR TO AMERICAN CAN COMPANY, OF NEW YORK, N. Y., A CORPORATION OF NEW JERSEY.

SOLDERING PROCESS.

1,293,977.   Specification of Letters Patent.   Patented Feb. 11, 1919.

Application filed March 9, 1912, Serial No. 682,689. Renewed June 27, 1918. Serial No. 242,308.

*To all whom it may concern:*

Be it known that I, WILLIAM E. TAYLOR, a citizen of the United States, residing in New York, in the county of New York and State of New York, have invented a new and useful Improvement in Soldering Processes, of which the following is a specification.

This invention relates to improvements in soldering processes.

The object of this invention is to provide a process of soldering which shall be specially adapted for applying final closures to can bodies, such as are used for instance, for containing food products.

In the final closing of soldered cans using a cap to close the stud-hole in the can end, it has been customary to leave a small vent hole in the cap which, after the cap has been soldered to the head, is subsequently "tipped". This process is unnecessarily expensive inasmuch as the cost of labor is increased and an extra amount of solder is required. Furthermore, this process is unsatisfactory on account of the fact that when the entire seam between the cap and the can end is fused or sweated at one operation, the amount of heat generated within the can by the soldering iron expands the gases therewithin or produces gases from the liquid portions of the contents, thus increasing the pressure of the gases within the can which causes pinholes or leaks in the soldered seam after the soldering iron is removed and before the solder has set or hardened.

By my process, I fuse or sweat the seam between the cap and the can head intermittently a small section at a time, and preferably decrease the size of the sections of the seam fused or sweated until the final portion to be fused is very small. The portions of the seam fused or sweated are allowed to cool after each heating operation, so that the gases within the can may escape from the unsoldered portions of the seam, and in order to allow the contents and the gases within the can to cool and contract. In this way the final closing of the seam is performed with the contents of the can in a cool condition, and I thus prevent the formation of pin holes or leaks in the seam.

My invention furthermore consists in the improvements in the steps and in the combinations of the steps hereinafter shown, described and claimed.

In the drawing forming a part of this specification, Figure 1 is a partial, vertical, diametrical section of a can body showing a final closure cap applied thereto. Fig. 2 is a plan view of a cap, the first portions of the same which are treated being shown cross hatched. Fig. 3 is a view, similar to Fig. 2, showing the seam at the end of the second step in the process, and Fig. 4 is a view, similar to Fig. 2, showing the final step in the closing operation. Fig. 5 is an inverted plan view of a soldering tool, such as may be used in carrying out the process, and Fig. 6 is a broken, sectional view of the soldering iron, shown in Fig. 5, taken on the line 6—6.

In the drawing, 10 denotes a can body, which may be of any suitable size or shape, and having secured thereto the top or head 11, the latter being provided with the usual form of opening 12 through which the material to be contained in the can is adapted to be inserted. The final closure cap 13 which, in carrying out my process, is not provided with the usual vent hole, is adapted to be seated on the rim or flange 14 of the can head 11 and to be soldered thereto. The solder may be applied to the seam in any suitable manner, preferably between the rim or flange 14 of the can head and the flange 15 of the cap. The solder is then heated and fused or sweated by means of any suitable heating iron, such, for instance, as is shown in Fig. 5 at 16, the same comprising a body portion 17 having a pair of diametrically disposed projections 18, the iron being adapted to be heated by any suitable means. In carrying out my process as applied to the can body and cap structure shown in the drawings, a heating iron is applied to the seam and diametrically opposite portions *a* are heated and fused and then allowed to cool. After this portion of the seam is treated, a second similar heating operation is performed on the adjacent portions of the seam *b* as shown in Fig. 3. After the second operation, the seam is again allowed to cool and a third or final heating and fusing operation is performed on the remaining sections *c*, the latter, as shown in the drawing, being preferably of shorter length than the previously treated sections of the seam. The process may be carried out with the single heating iron or a number of such irons, by having the can conveyed to them, and furthermore, it will be obvious that any number of intermediate heating and fusing steps may be employed without departing from the spirit of the invention.

I claim:—

1. The process of soldering a final imperforate closure to a can body, consisting first in heating and fusing the solder on a portion of the seam, allowing said portion of the seam to cool and the solder to set, then after an interval, heating and fusing the solder on another and adjacent portion of the seam and allowing it to cool and set.

2. The process of soldering a final imperforate closure cap to a food container can body, which consists in heating and fusing and allowing to cool simultaneously, diametrically opposite, segmental portions of the seam, and intermittently repeating the steps on segmental portions of the seam adjacent to the previously treated portions until the entire seam is fused and set.

3. The process of soldering a final imperforate closure to a filled food container can head, which consists: in first successively soldering portions of the seam which unites said final closure to the head, and leaving a small portion of the seam unsoldered for the escape of gases and leaving the solder therefor unfused; then causing a cessation of the heating action and allowing the solder of the soldered portions of the seam to harden; and subsequently fusing the solder of, and soldering, the remaining small portion of the seam.

4. The process of soldering a final imperforate closure to a filled food container can head, which consists: in first successively soldering portions of the seam which unites said final closure to the head, with intervals between said soldering actions, and leaving a small portion of the seam unsoldered for the escape of gases, and leaving the solder therefor unfused; and then causing the cessation of the soldering and heating action and allowing the solder of the soldered portion of the seam to harden; and subsequently applying a small amount of heat to fuse the solder of the small remaining and unsoldered portion of the seam, and soldering the same without causing internal pressure which would produce pin holes or leaks in the seam.

WILLIAM E. TAYLOR.

Witnesses:
W. D. FOSTER,
C. W. GRAHAM.